L. A. ASPINWALL.
Corn-Husking Machines.
No. 144,590.　　　　　Patented Nov. 18, 1873.
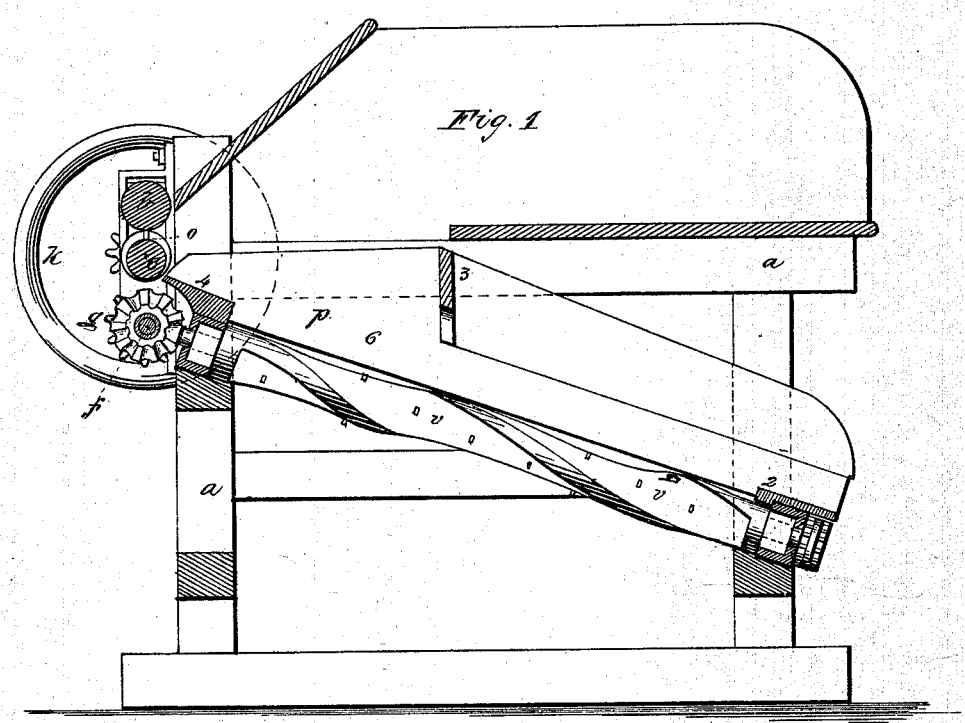
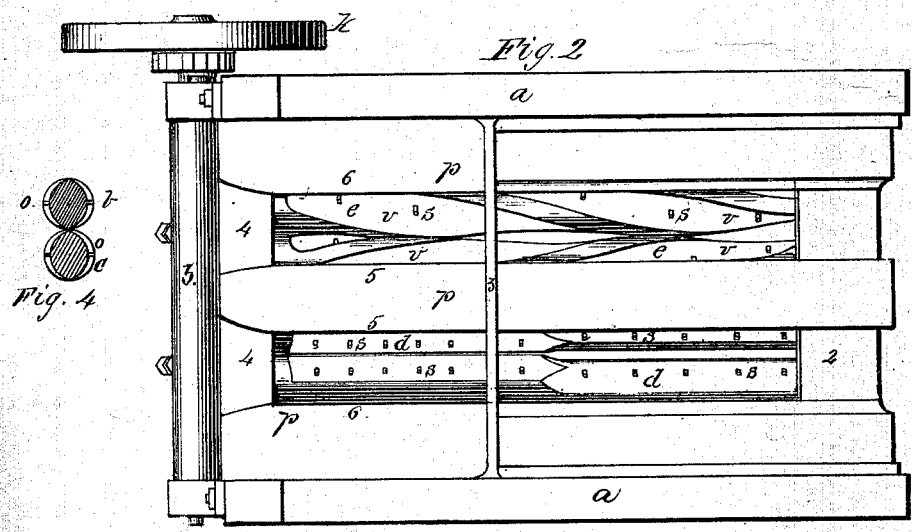
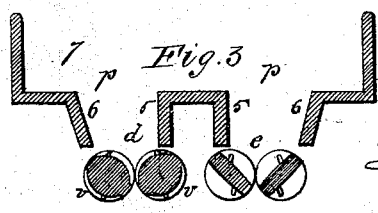
Witnesses　　　　　Inventor.

UNITED STATES PATENT OFFICE.

L. AUGUSTUS ASPINWALL, OF ALBANY, NEW YORK.

IMPROVEMENT IN CORN-HUSKING MACHINES.

Specification forming part of Letters Patent No. 144,590, dated November 18, 1873; application filed December 22, 1870.

*To all whom it may concern:*

Be it known that I, L. AUGUSTUS ASPINWALL, of the city and county of Albany, and State of New York, have invented and made a new and useful Improvement in Machine for Picking and Husking Corn; and the following is declared to be a correct description of the same.

This invention is an improvement upon that for which Letters Patent were granted to me April 12, 1870, No. 101,809, and have since been reissued. My present invention relates to the construction of the husking-rollers with spiral depressions that allow the husk to pass into the depressions, and then the rollers nip and pull off the husk. The spiral form of these depressions in the husking-rollers renders them more effective than the depressions shown in aforesaid patent, and there is a more easy movement of the parts, because some portions of the rollers are always in contact. I also make use of picking-rollers that act with an irregular force to draw the stalk through, in order that the ear may be broken off by the sudden pull occurring when the rollers take the most firm hold of the stalk, and this is accomplished by depressions in one or both of the rollers, said depressions not being flutes, or having edges that tend to cut or break the stalk, but the same are only segments removed from the roller or rollers that give to the surface a cam shape, for the purposes before named. I also employ a movable guide-trough over the husking-rollers, that can be lifted off for cleaning the rollers or oiling the bearings, and, when in place, guides the ear of corn properly to present it to the husking-rollers.

In the drawing, Figure 1 is a longitudinal section of the husking-machine. Fig. 2 is a plan of the same with the table and guide-board removed. Fig. 3 is a cross-section of the husking-rollers and trough; and Fig. 4 is a section, showing a modification of the picking-rollers.

The frame *a* of the machine is of any usual size or construction. *b c* are the picking-rollers. *d d* and *e e* are the pairs of husking-rollers. I have shown a double machine, there being two pairs of husking-rollers, but the machine might be made with only one pair of husking-rollers. The main shaft *f* of the machine is driven by competent power, and is connected by bevel-gearing *g g* with the rollers *d* and *e*, and by gear-wheels with the picking-roller *c*, and the motive power may be applied by a band-wheel, *k*, or in any other convenient manner. The picking-roller *b* is to be set with its journals in yielding bearings, and the rollers *c* and *b* should be geared together, and for this purpose gear-wheels with double ranges of teeth are preferable, because they can be made strong, and so as to run with uniformity.

The roller *c* is shown in Fig. 1 as made with a depressed surface around about four-fifths of its periphery, and there are projecting teeth upon this roller, as at *o*. The roller *b* may be a plain cylinder, or it may have a depressed surface similar to that of the roller *c*, or one or both of these rollers *b c* may have two or more depressions running lengthwise of the cylinders or in a spiral line.

In either of the forms before named the picking-rollers do not maintain a uniform hold upon the cornstalk, but produce an irregular drawing action that is beneficial in breaking off the ears. When the cylindrical portions of the rollers gripe the stalk and pull it along suddenly, the stalk will be moved away from the ear, breaking off the latter, and then the depressions in the rollers lessen the hold upon the stalk, facilitating the separation of the ear from the leaves, so that the ear may fall into the husking portion of the machine, and at the same time there is opportunity for the attendant to spread the stalks, so that they may pass through the machine with uniformity.

The husking-rollers are arranged in pairs and set at an inclination, so that the ear runs down them and is guided by the trough *p*. The trough *p* is made as a movable frame, the parts being connected to each other by the cross-bars 2 3 4, so that the entire frame can be lifted out endwise to give free access to the husking-rollers for cleaning, oiling, or repairing. The sides 5 of the troughs come nearer to the openings between the pairs of rollers than do the sides 6, so that the ear, lying with more weight upon one roller than the other, is rotated as it slides down the rollers, in order that the husks may be pulled off all around the ear.

The husking-rollers are made with depressions in their surfaces, as shown in the cross-section, Fig. 3, and these depressions instead of running along on the rollers in a straight line, as in the aforesaid patent, are made in a spiral form, as shown at $v$, so that the pull upon the husk and the letting go will not be so sudden, and there will always be some portion of the cylindrical surfaces in contact to prevent concussion and insure the easier running of the machine.

In the drawing I have shown one pair of rollers with the depressions running in a straight line, as in aforesaid patent, but my present improvement relates only to the spiral depressions.

The teeth $s$ $s$ that are introduced along the husking-rollers and in the depressed portions of the surface, serve to loosen up the husks, so as to allow the rollers to catch such husks and pull them off.

I claim—

1. The husking-rollers $e$ $e$, when provided with spiral depressions $v$ upon their peripheries, and formed as described, substantially as and for the purposes set forth.

2. In a machine for husking corn, the picking and feeding rollers $b$ $c$, formed with flattened surfaces or depressions, as shown, and without ribs or cutting-edges of any kind, that as the stalk is passed between said rollers the ear shall be suddenly removed by the impinging of the eccentric surfaces of said rollers upon the same, in the manner substantially as described.

3. In combination with husking-rollers, arranged to operate substantially as described, the trough $p$, when constructed as shown, and made removable endwise from the machine, as and for the purposes specified.

Signed by me this 15th day of December A. D. 1870.

L. AUGS. ASPINWALL.

Witnesses:
  G. L. STEDMAN,
  JNO. R. SHEPARD.